(12) United States Patent
Jiménez et al.

(10) Patent No.: US 10,855,648 B2
(45) Date of Patent: Dec. 1, 2020

(54) METHODS AND APPARATUS FOR OPERATING AND MANAGING A CONSTRAINED DEVICE WITHIN

(71) Applicant: Telefonaktiebolaget LM Ericsson (publ), Stockholm (SE)

(72) Inventors: Jaime Jiménez, Helsinki (FI); Jan Melén, Espoo (FI); Mert Ocak, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/466,779

(22) PCT Filed: Dec. 5, 2016

(86) PCT No.: PCT/SE2016/051218
§ 371 (c)(1),
(2) Date: Jun. 5, 2019

(87) PCT Pub. No.: WO2018/106159
PCT Pub. Date: Jun. 14, 2018

(65) Prior Publication Data
US 2019/0319917 A1 Oct. 17, 2019

(51) Int. Cl.
*H04L 29/12* (2006.01)
*H04L 12/18* (2006.01)
*H04L 12/28* (2006.01)

(52) U.S. Cl.
CPC ...... *H04L 61/2069* (2013.01); *H04L 12/1859* (2013.01); *H04L 12/2803* (2013.01); *H04L 61/1511* (2013.01)

(58) Field of Classification Search
CPC .................. H04W 4/70; G06F 16/00
See application file for complete search history.

(56) References Cited

U.S. PATENT DOCUMENTS

| 2012/0303746 A1* | 11/2012 | Yu | H04L 67/12 |
| | | | 709/217 |
| 2015/0036881 A1* | 2/2015 | Sharma | G06F 16/50 |
| | | | 382/103 |

(Continued)

FOREIGN PATENT DOCUMENTS

| EP | 1971109 A1 * | 9/2008 | .......... H04L 67/00 |
| EP | 1971109 A1 | 9/2008 | |
| GB | 2350758 A * | 12/2000 | .......... G06Q 30/02 |

OTHER PUBLICATIONS

Borman et al. "Terminology for Constrained-Node Networks", Internet Engineering Task Force (IETF), May 2014 (Year: 2014).*

(Continued)

*Primary Examiner* — Jamaal Henson
(74) *Attorney, Agent, or Firm* — Sage Patent Group

(57) ABSTRACT

A method for operating a constrained device within a network is disclosed. The constrained device is configured with a plurality of data objects and a mapping between at least one of the data objects and a multicast address. The method includes detecting that the constrained device should send a notification 104 and determining a topic to which the notification relates. The method further includes, if the topic corresponds to a data object, retrieving the data object to which the topic corresponds, retrieving a mapped multicast address corresponding to the data object, and posting the notification to the retrieved multicast address.

20 Claims, 12 Drawing Sheets

(56) References Cited

U.S. PATENT DOCUMENTS

| | | | |
|---|---|---|---|
| 2015/0294431 A1* | 10/2015 | Fiorucci | G07B 15/02 |
| | | | 705/13 |
| 2016/0036908 A1* | 2/2016 | Aggarwal | H04L 67/16 |
| | | | 370/254 |
| 2016/0241660 A1* | 8/2016 | Nhu | H04L 67/26 |
| 2016/0294614 A1* | 10/2016 | Searle | H04L 67/34 |
| 2018/0032997 A1* | 2/2018 | Gordon | G06Q 30/0269 |

OTHER PUBLICATIONS

3GPP TSG-SA WG1 Meeting #76, "Smarter-Constrained Devices", S1-163121, Nov. 2016 (Year: 2016).*

International Search Report and Written Opinion of the International Searching Authority, PCT/SE2016/051218, dated Jun. 29, 2017, 11 pages.

"Initial Architecture of OpenAIS System," Version 2.0, Jul. 18, 2016; OpenAIS; H2020-ICT-2014.1.644332; http://www.openais.eu/user/file/openais_reference_architecture_(d2.3)_v2.0-pub.pdf; 155 pages.

"Multicast Security for the Lighting Domain," draft-somaraju-ace-multicast-00.txt; Jul. 6, 2015; Internet Engineering Task Force, IETF; 22 pages.

"CoRE Resource Directory," draft-ietf-core-resource-directory-03.txt; Jun. 22, 2015, IETF; 49 pages.

"CoAP Functionality Expected in a LWM2M System," draft-jimenez-t2trg-coap-functionality-lwm2m-00.txt; Oct. 31, 2016, IETF; 8 pages.

"CoRE Resource Directory," draft-ietf-core-resource-directory-02.txt, Nov. 9, 2014, 37 pages.

Oasis, MQTT Version 3.1.1, Oasis Standard, Oct. 29, 2014, http://docs.oasis-open.org/mqtt/mqtt/v3.1.1/os/mqtt-v3.1.1-os.pdf, 81 pages.

OMA (Open Mobile Alliance) Lightweight Machine to Machine Technical Specification. Draft Version 1.0—May 17, 2016, Open Mobile Alliance, OMA-TS-LightweightM2M-V1_0-20160517-D, 128 pages.

OMA (Open Mobile Alliance) Lightweight Machine to Machine Technical Specification, Draft Version 1.0—May 17, 2016, Open Mobile Alliance OMA-TS-LightweightM2M-V1_0-20160517-D, 137 pages.

Extended European Search Report dated May 12, 2020 for European Patent Application No. 16923540.5, 7 pages.

Koster et al., "Publish-Subscribe Broker for the Constrained Application Protocol (CoAP)," Internet Engineering Task Force, Internet Society (Isoc) 4, Geneva, Switzerland, Oct. 21, 2016, pp. 1-22 (22 pages).

* cited by examiner

METHODS AND APPARATUS FOR OPERATING AND MANAGING A CONSTRAINED DEVICE WITHIN

CROSS REFERENCE TO RELATED APPLICATIONS

This application is a 35 U.S.C. § 371 national stage application of PCT International Application No. PCT/SE2016/051218 filed on Dec. 5, 2016, the disclosure and content of which is incorporated by reference herein in its entirety.

TECHNICAL FIELD

The present disclosure relates to a method for operating a constrained device within a network and to a method for managing a constrained device within a network. The present disclosure also relates to a constrained device, to a manager for a constrained device and to a computer program and a computer program product configured, when run on a computer to carry out methods performed in a constrained device and in a manager for a constrained device.

BACKGROUND

The "Internet of Things" (IoT) refers to devices enabled for communication network connectivity, so that these devices may be remotely managed, and data collected or required by the devices may be exchanged between individual devices and between devices and application servers. Such devices are often subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as IPv4 or IPv6, and dedicated protocols for constrained devices, including the Constrained Application Protocol (CoAP), as defined in RFC7252, and Message Queuing Telemetry Transport (MQTT), as defined in ISO/IEC PRF 20922. Management of constrained devices may be performed using any suitable management protocol, including for example the Lightweight Machine to Machine (LWM2M) protocol, defined by the Open Mobile Alliance.

With the advent of IoT, the density of connected devices is expected to grow, meaning that large numbers of connected devices may be deployed in a relatively small area. Such devices are likely to require one or more gateways to enable them to connect to other networks, including local networks and wider networks which may be accessed via the Internet. One standard vision of IoT, which is shared by several actors in the telecommunications industry, proposes certain network elements which would always be present in an IoT deployment. These elements include:

A CoAP Resource Directory (RD) for hosting descriptions of resources held on CoAP servers, allowing lookups to be performed for those resources. A Resource Directory allows for resource discovery even when devices hosting those resources are in a low power state such as a sleep mode, or operating in different networks or subnetworks.

An MQTT broker (or similar publish/subscribe broker) for providing one-to-many message distribution and decoupling of applications. The broker is primarily responsible for receiving messages from constrained devices, filtering the messages, establishing which clients should receive each message and then sending messages to the relevant clients. The broker allows for the creation of topics, to which messages may be published and to which clients may subscribe, and the broker then manages the publication of and subscription to information.

A LWM2M Server/Client for managing devices, including the receiving of error reports, updating device configurations, creating access policies, etc.

A data model representing constrained device capabilities and information. In deployments using CoAP, such capabilities and information are generically referred to as resources. However other forms of representation focusing on semantic information concerning the devices may also be used. IPSO object models are an example of such a data model, in which information is represented as Object/instance/resource.

An operational model for an IoT network comprising a plurality of constrained devices using the CoAP protocol, and thus referred to as CoAP End Points (EPs), and including the above discussed entities could run as follows:

EPs register their resources in the RD using the IPSO Object model. An example humidity sensor registration on the RD could be:

POST /rd?ep='123456789';</3304/0/5700>;rt="urn:X-ipso:hum%".

This post indicates that a sensor with the unique resource name 123456789 is to be registered on the RD. The IPSO object model data indicates that the sensor is a humidity sensor (/3304), is instance 0 of the humidity sensor (/0) and has one resource (5700) representing the humidity reading itself in percentage. The "rt" indicates that the representation used is the IPSO object model.

Similarly EPs can also register information in the RD as a topic that other EPs can subscribe to. The example humidity sensor may thus register humidity object information as a topic using the registration:

POST /rd; "</pubsub/0/3304>;rt=core.pubsub.client".

Other EPs may then both publish notifications to the newly registered topic and subscribe to notifications posted to this topic.

Once registered, EPs may then start publishing their data to the MQTT (or other publish/subscribe) broker, or may wait for GET requests from other nodes. Published data would appear as a normal CoAP notification to the broker.

Initial configuration and setup of the EPs may be performed by the LWM2M server/client using the LWM2M management protocol. This may include establishing subscription between EPs and towards the manager as well as handling errors that may occur during normal functioning of the network.

The above discussed operational model represents a possible deployment scenario according to current research into IoT. It is an ongoing research challenge to refine and simplify the possible deployment scenario, so facilitating the wide scale adoption of IoT technologies.

SUMMARY

It is an aim of the present disclosure to provide a method, apparatus and computer readable medium which at least partially address one or more of the challenges discussed above.

According to a first aspect of the present disclosure, there is provided a method for operating a constrained device within a network, the constrained device being configured with a plurality of data objects and a mapping between at least one of the data objects and a multicast address. The method comprises detecting that the constrained device should send a notification and determining a topic to which the notification relates. The method further comprises, if the topic corresponds to a data object, retrieving the data object to which the topic corresponds, retrieving a mapped multicast address corresponding to the data object, and posting the notification to the retrieved multicast address.

For the purposes of the present disclosure, a constrained device comprises a device which conforms to the definition set out in section 2.1 of RFC 7228 for "constrained node". According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks.

According to examples of the present disclosure, the method may further comprise, if the topic corresponds to a property of a controlled device, retrieving a mapped multicast address corresponding to the property and posting the notification to the retrieved multicast address.

According to examples of the present disclosure, the property may be a property of the constrained device performing the method or of another constrained device.

According to examples of the present disclosure, the method may further comprise associating a Time To Listen (TTL) with the notification when posting the notification.

According to examples of the present disclosure, the TTL may for example be defined as a number of hops.

According to examples of the present disclosure, the method may further comprise receiving a notification on a multicast address to which the constrained device is listening, and forwarding the notification on the multicast address.

According to examples of the present disclosure, the method may further comprise the constrained device performing some action as a consequence of the notification.

According to examples of the present disclosure, the method may further comprise checking for a TTL associated with the notification and only forwarding the notification if the TTL has not been reached.

According to examples of the present disclosure, the method may further comprise identifying a property of a constrained device, mapping a representation of the property to a multicast address and posting the multicast address to a directory.

According to examples of the present disclosure, the directory may for example be a Resource Directory as defined in the "CoRE Resource Directory" specification: "draft-ietf-core-resource-directory-09".

According to examples of the present disclosure, the property may be a property of the constrained device performing the method or of another constrained device.

According to examples of the present disclosure, the multicast address may be posted to the directory as corresponding to a topic, the topic being the property a representation of which was mapped to create the multicast address.

According to examples of the present disclosure, mapping a representation of the property to a multicast address may comprise performing an operation on the representation of the property to convert the representation to an integer value, and inserting the integer value into a multicast address.

According to examples of the present disclosure, the representation of the property may for example be metadata such as text describing the property. The property may for example comprise a location of a constrained device, an owner of a constrained device etc.

According to examples of the present disclosure, the operation may comprise a hash function.

According to examples of the present disclosure, the constrained device may also register itself with the directory.

According to examples of the present disclosure, the method may further comprise, receiving an instruction to listen to notifications concerning a property of the constrained device, mapping a representation of the property to a multicast address, and listening to notifications on the mapped multicast address.

According to examples of the present disclosure, listening to notifications on the mapped multicast address may comprise writing the mapped multicast address into a routing table of the constrained device.

According to examples of the present disclosure, mapping a representation of the property to a multicast address may comprise performing an operation on the representation of the property to convert the representation to an integer value, and inserting the integer value into a multicast address.

According to examples of the present disclosure, the representation of the property may for example be metadata such as text describing the property. The property may for example comprise a location of a constrained device, an owner of a constrained device etc.

According to examples of the present disclosure, the operation may comprise a hash function.

According to examples of the present disclosure, the method may further comprise receiving an instruction identifying the operation to perform to convert the representation to an integer value.

According to examples of the present disclosure, the method may further comprise receiving an update to the property, mapping a representation of the updated property to a multicast address, and listening to notifications on the mapped multicast address.

According to examples of the present disclosure, the constrained device may be configured to receive instructions over the Lightweight Machine to Machine (LWM2M) specification.

According to examples of the present disclosure, the multicast address may comprise an IPv6 multicast address.

According to examples of the present disclosure, the device may be configured to communicate using a RESTful protocol.

According to examples of the present disclosure, the protocol may be the Constrained Application Protocol (CoAP).

According to examples of the present disclosure, the data objects may be defined using an IPSO data model.

According to examples of the present disclosure, the data model may use the object representation: Object ID/Instance ID/Resource ID.

According to another aspect of the present disclosure, there is provided a method for managing a constrained device within a network, the constrained device being configured with a plurality of data objects. The method comprises configuring the device with a mapping between at least one of the data objects and a multicast address and instructing the device to publish notifications relating to a data object by posting the notifications to a mapped multicast address corresponding to the data object. The method further comprises instructing the device to subscribe to notifications relating to a data object by listening to a mapped multicast address corresponding to the data object.

According to examples of the present disclosure, instructing the device to subscribe to notifications relating to a data object by listening to notifications on the mapped multicast address may comprise causing the mapped multicast address to be written into a routing table of the constrained device.

According to examples of the present disclosure, the method may further comprise instructing the device to listen to notifications concerning a property of the constrained device.

According to examples of the present disclosure, the method may further comprise instructing the device with an operation to perform on a representation of the property in order to map the representation of the property to a multicast address.

According to examples of the present disclosure, the method may further comprise identifying a property of the constrained device, mapping a representation of the property to a multicast address, and posting the multicast address to a directory.

According to examples of the present disclosure, the directory may for example be a Resource Directory as defined in the "CoRE Resource Directory" specification: "draft-ietf-core-resource-directory-09". According to examples of the present disclosure, the multicast address may be posted to the directory as corresponding to a topic, the topic being the property, a representation of which was mapped to create the multicast address.

According to examples of the present disclosure, mapping a representation of the property to a multicast address may comprises performing an operation on the representation of the property to convert the representation to an integer value, and inserting the integer value into a multicast address.

According to examples of the present disclosure, the representation of the property may for example be metadata such as text describing the property. The property may for example comprise a location of a constrained device, an owner of a constrained device etc. The operation may be the same operation that was instructed to the constrained device.

According to examples of the present disclosure, the operation may comprise a hash function.

According to examples of the present disclosure, the configuring the device may comprise communicating over the LWM2M specification.

According to examples of the present disclosure, the multicast address may comprise an IPv6 multicast address.

According to examples of the present disclosure, the device may be configured to communicate using a RESTful protocol.

According to examples of the present disclosure, the protocol may be CoAP.

According to examples of the present disclosure, the data objects may be defined using an IPSO data model.

According to examples of the present disclosure, the data model may use the object representation: Object ID/Instance ID/Resource ID.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a constrained device, the constrained device being configured with a plurality of data objects and a mapping between at least one of the data objects and a multicast address. The constrained device comprises a processor and a memory, the memory containing instructions executable by the processor such that the constrained device is operable to detect that the constrained device should send a notification and determine a topic to which the notification relates. The constrained device is further operable, if the topic corresponds to a data object, to retrieve the data object to which the topic corresponds, retrieve a mapped multicast address corresponding to the data object, and post the notification to the retrieved multicast address.

According to another aspect of the present disclosure, there is provided a constrained device, the constrained device being configured with a plurality of data objects and a mapping between at least one of the data objects and a multicast address. The constrained device is adapted to detect that the constrained device should send a notification, determine a topic to which the notification relates, and if the topic corresponds to a data object, retrieve the data object to which the topic corresponds, retrieve a mapped multicast address corresponding to the data object, and post the notification to the retrieved multicast address.

According to another aspect of the present disclosure, there is provided a constrained device, the constrained device being configured with a plurality of data objects and a mapping between at least one of the data objects and a multicast address. The constrained device comprises a detection module for detecting that the constrained device should send a notification, and a notification module for determining a topic to which the notification relates. The notification module is also for, if the topic corresponds to a data object, retrieving the data object to which the topic corresponds, retrieving a mapped multicast address corresponding to the data object, and posting the notification to the retrieved multicast address.

According to another aspect of the present disclosure, there is provided a manager for managing a constrained device, the constrained device being configured with a plurality of data objects. The manager comprises a processor and a memory, the memory containing instructions executable by the processor such that the manager is operable to configure the device with a mapping between at least one of the data objects and a multicast address and instruct the device to publish notifications relating to a data object by posting the notifications to a mapped multicast address corresponding to the data object. The manager is further operable to instruct the device to subscribe to notifications relating to a data object by listening to a mapped multicast address corresponding to the data object.

According to another aspect of the present disclosure, there is provided a manager for managing a constrained device, the constrained device being configured with a plurality of data objects. The manager is adapted to configure the device with a mapping between at least one of the data objects and a multicast address, instruct the device to publish notifications relating to a data object by posting the notifications to a mapped multicast address corresponding to the data object, and instruct the device to subscribe to notifications relating to a data object by listening to a mapped multicast address corresponding to the data object.

According to another aspect of the present disclosure, there is provided a manager for managing a constrained device, the constrained device being configured with a plurality of data objects. The manager comprises a mapping module for configuring the device with a mapping between at least one of the data objects and a multicast address, and an instructing module for instructing the device to publish notifications relating to a data object by posting the notifications to a mapped multicast address corresponding to the data object, and for instructing the device to subscribe to notifications relating to a data object by listening to a mapped multicast address corresponding to the data object.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide methods according to which a constrained device configured with a plurality of data objects may additionally be configured with a mapping between at least one of the data objects and a multicast address. The constrained device may then publish notifications relating to a data object by posting the notifications to a mapped multicast address corresponding to the data object. The device may additionally subscribe to notifications relating to a data object by listening to a mapped multicast address corresponding to the data object. In this manner, constrained devices may take advantage of a possibility to map multicast addresses to existing data models. In some examples of the present disclosure, the multicast addresses may be IPv6 multicast addresses, and the data models may be IPSO data objects. A network deployment may thus be envisaged in which there is no need for a publish/subscribe broker. Instead of publishing notifications to a broker, and relying on the broker to forward notifications to subscribed clients, devices may publish notifications to mapped multicast addresses, and may subscribe to notifications by listening to multicast addresses mapped to data objects or topics to which they would previously have subscribed.

Figure 1:
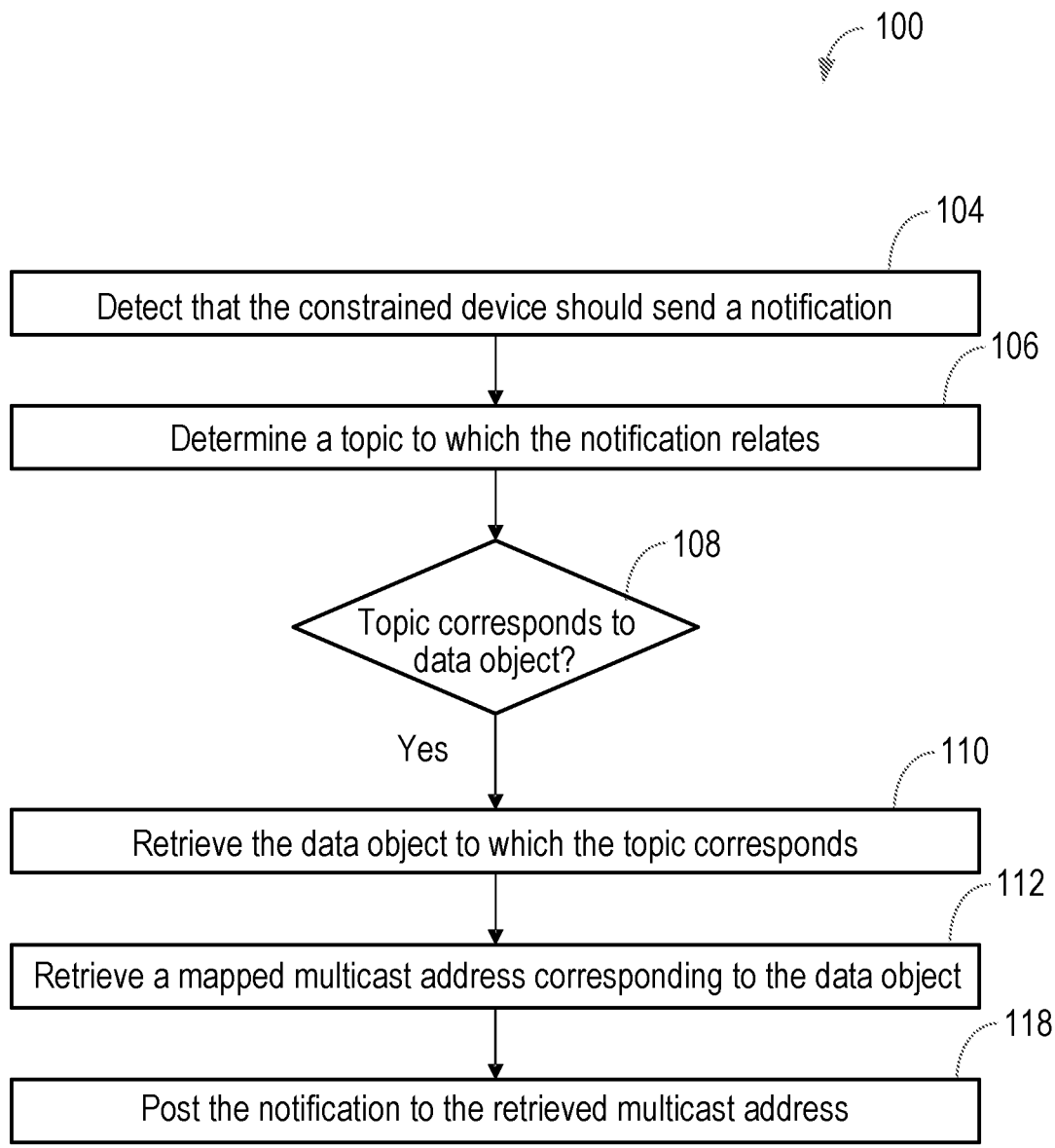
FIG. 1 is a flow chart illustrating process steps in a method for operating a constrained device within a network.

FIG. 1 is a flow chart illustrating process steps in a method 100 for operating a constrained device in accordance with aspects of the present disclosure. The constrained device is configured with a plurality of data objects and a mapping between at least one of the data objects and a multicast address. This configuration is discussed in further detail below with reference to FIGS. 3, 4a and 4b. The constrained device may be configured to communicate using a RESTful protocol including for example CoAP, MQTT, HTTP etc. Referring to FIG. 1, the method 100 comprises, in a first step 104, the constrained device detecting that it should send a notification. The constrained device then determines a topic to which the notification relates in step 106 and determines whether or not that topic corresponds to a data object in step 108. If the topic corresponds to a data object, the constrained device retrieves the data object to which the topic corresponds in step 110, retrieves a mapped multicast address corresponding to the data object in step 112, and posts the notification to the retrieved multicast address in step 118. Step 118 of posting the notification to the multicast address may take different forms depending upon the communication protocol used by the constrained device. For example, if the constrained device uses CoAP, the notification may be posted using a CoAP PUT request operation. Other operations may be used by constrained devices using different communication protocols. As discussed above, the multicast address or addresses to which data objects are mapped may be IPv6 multicast addresses.

Figure 2A:
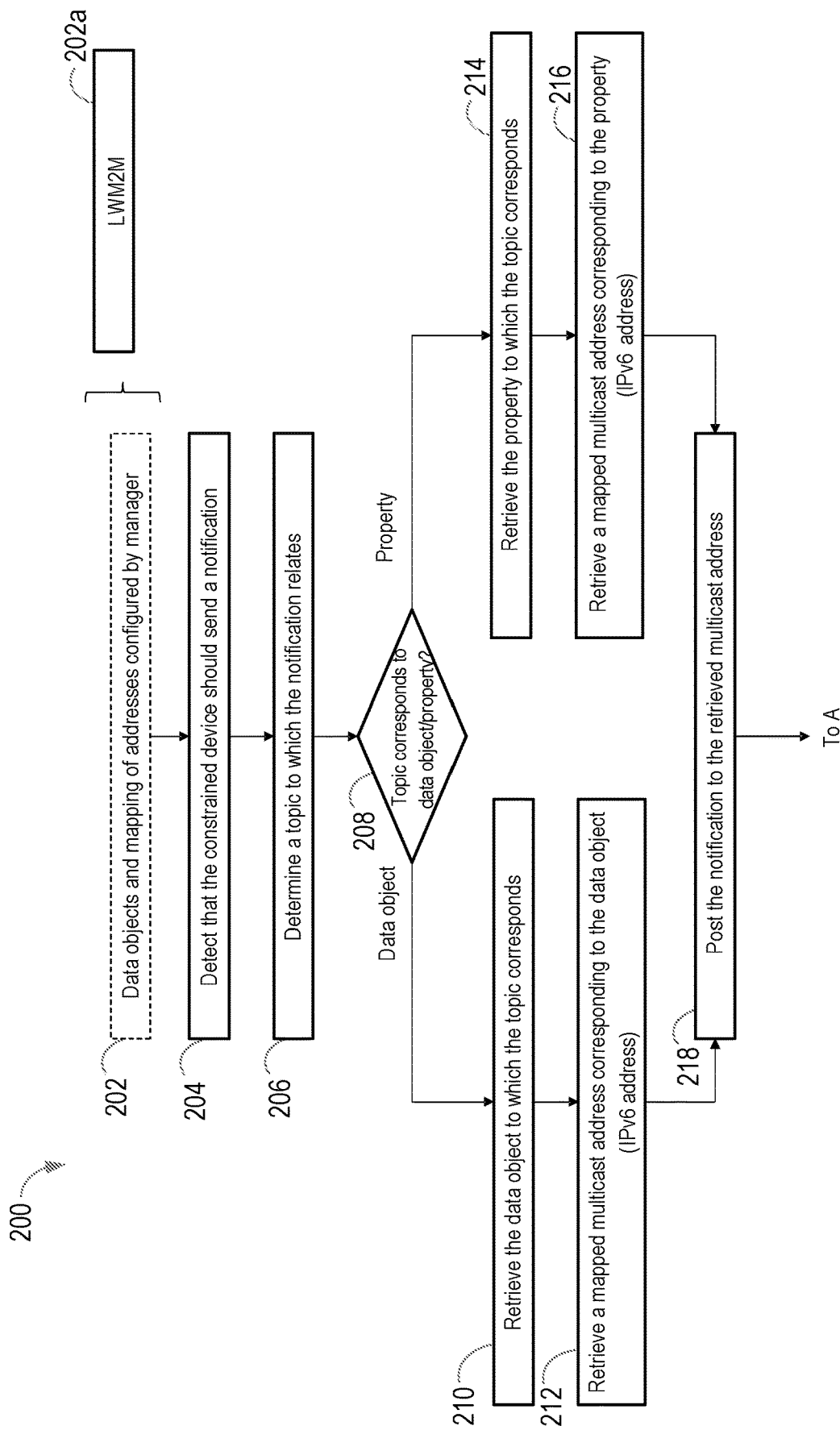
FIGS. 2a to 2d are flow charts illustrating process steps in another example of method for operating a constrained device within a network.
Figure 2B:
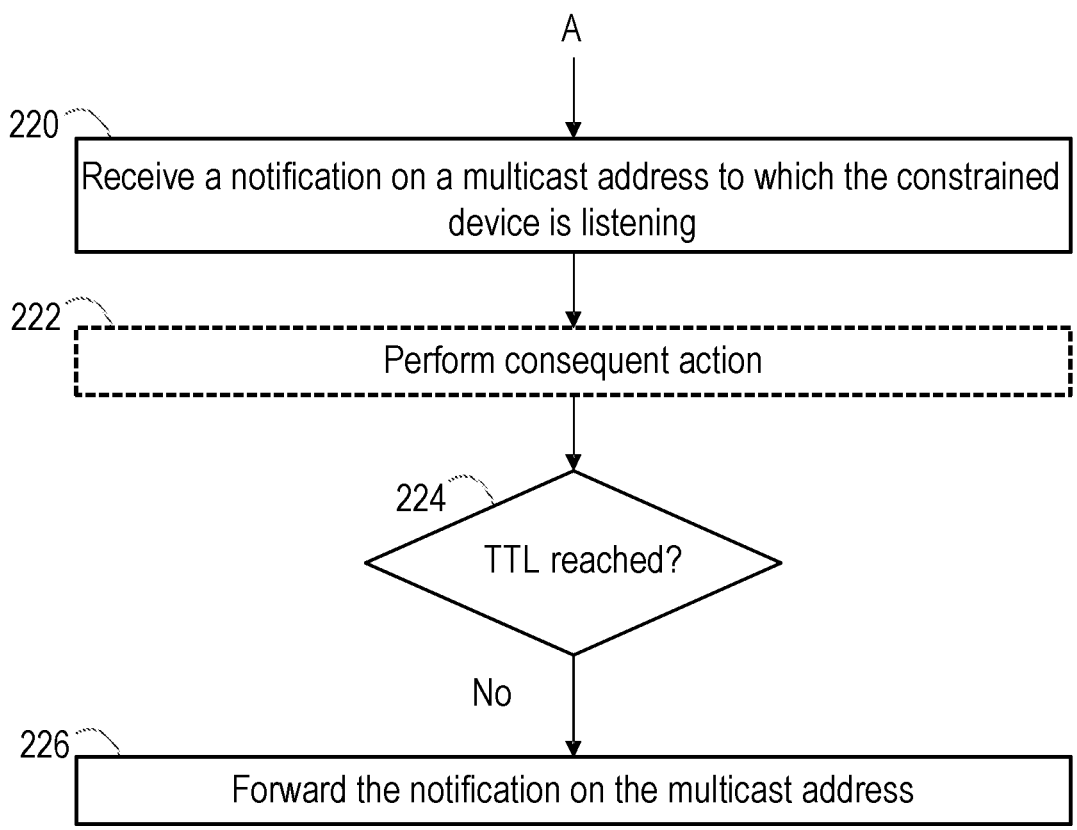

FIGS. 2a and 2b illustrate process steps in another example of method 200 for operating a constrained device in accordance with aspects of the present disclosure. The steps of the method 200 illustrate one way in which the steps of the method 100 may be subdivided and supplemented in order to achieve the above discussed and additional functionality. The constrained device conducting the method 200 is configured with a plurality of data objects and a mapping between at least one of the data objects and a multicast address. Referring to FIG. 2a, the configuration of data objects and a mapping between at least one of the data objects and a multicast address may be conducted by a manager in step 202 of the method 200. This configuration may be conducted for example using the Lightweight M2M (LWM2M) protocol, as illustrated in step 202a. The method 200 then comprises, in step 204, the constrained device detecting that it should send a notification. The constrained device then determines a topic to which the notification relates in step 206 and determines in step 208 whether that topic corresponds to a data object or to a property of a constrained device. The property may be a property of the constrained device conducting the method 200, or may be a property of another constrained device. Examples of properties of constrained devices include device location, device owner etc. If the topic corresponds to a data object, the constrained device retrieves the data object to which the topic corresponds in step 210, retrieves a mapped multicast address corresponding to the data object in step 212, and posts the notification to the retrieved multicast address in step 218. Step 218 of posting the notification to the multicast address may take different forms depending upon the communication protocol used by the constrained device, as discussed above. The multicast address or addresses to which data objects are mapped may be IPv6 multicast addresses. In some examples of the method 200, the constrained device may associate a Time To Listen (TTL) with the notification when posting the notification. The TTL may for example be defined as a number of hops, and may ensure that a network is not flooded with messages which may be out of date yet may continue to be forwarded if no limit is placed on their circulation.

If the topic corresponds to a property of a constrained device, the constrained device retrieves the property to which the topic corresponds in step 214, retrieves a mapped multicast address corresponding to the property in step 216, and posts the notification to the retrieved multicast address in step 218. A mapping between the retrieved property and a multicast address may be configured in the constrained device, or may be established by the constrained device, for example following steps 232 and 234, of the method 200, as discussed below with reference to FIG. 2c.

Referring now to FIG. 2b, in step 220, the constrained device receives a notification on a multicast address to which the constrained device is listening. The constrained device may then perform an action as a consequence of the received notification in step 222, depending upon the nature of the notification and the configuration of the constrained device. In some examples, the notification may not prompt any consequent action from the constrained device. In step 224, the constrained device checks whether a TTL for the notification has been reached. If the TTL has been reached, then the constrained device drops the notification without forwarding it any further. If the TTL has not been reached, then the constrained device forwards the notification on the multicast address on which it was received.

As discussed above, the topics to which both received and posted notifications may relate may correspond to a data object or to a property of a constrained device. Topics corresponding to a data object may be pre-set and substantially unchanging, relating as they do to an object identifier of an individual constrained device. Using the example of a constrained device comprising a humidity sensor and an IPSO Objects data model, the Object ID=3304 would map to the IPv6 multicast address FF02::3304.

This mapping may be configured into the constrained device by a device manager, for example at step 202 of the method 200. The device may then publish notifications to that address whenever there is a certain change on its sensor reading. In some examples, the instance and the resource value itself may also be specified on the IPv6 address. A scenario may be envisaged in which an association is established between lights and switches, all using IPSO objects, with the lights configured to accept multicast packets or perform an action when a multicast packet with the address FF02::1:3306 or FF02::0:3306 is sent. These two addresses represent the IPSO Actuation Object (3306) in its two possible states: ON and OFF. In another example scenario, a constrained device manager could set an existing Actuator, for example operating a door, to listen to FF02::1:3306 and to perform an action to open the door when a notification is received on that address. In still another example scenario, an alarm could be configured to listen to FF02::0:3306 and to actuate, sounding the alarm, when a notification is received on that address.

In contrast to the pre-set topics corresponding to data objects, topics corresponding to a property of a constrained device may be established by a manager or by the device itself, and may depend upon a particular use case or deployment scenario. Example process steps for establishing a topic corresponding to a property are illustrated at steps 232 to 236 of FIG. 2c.

Figure 2C:
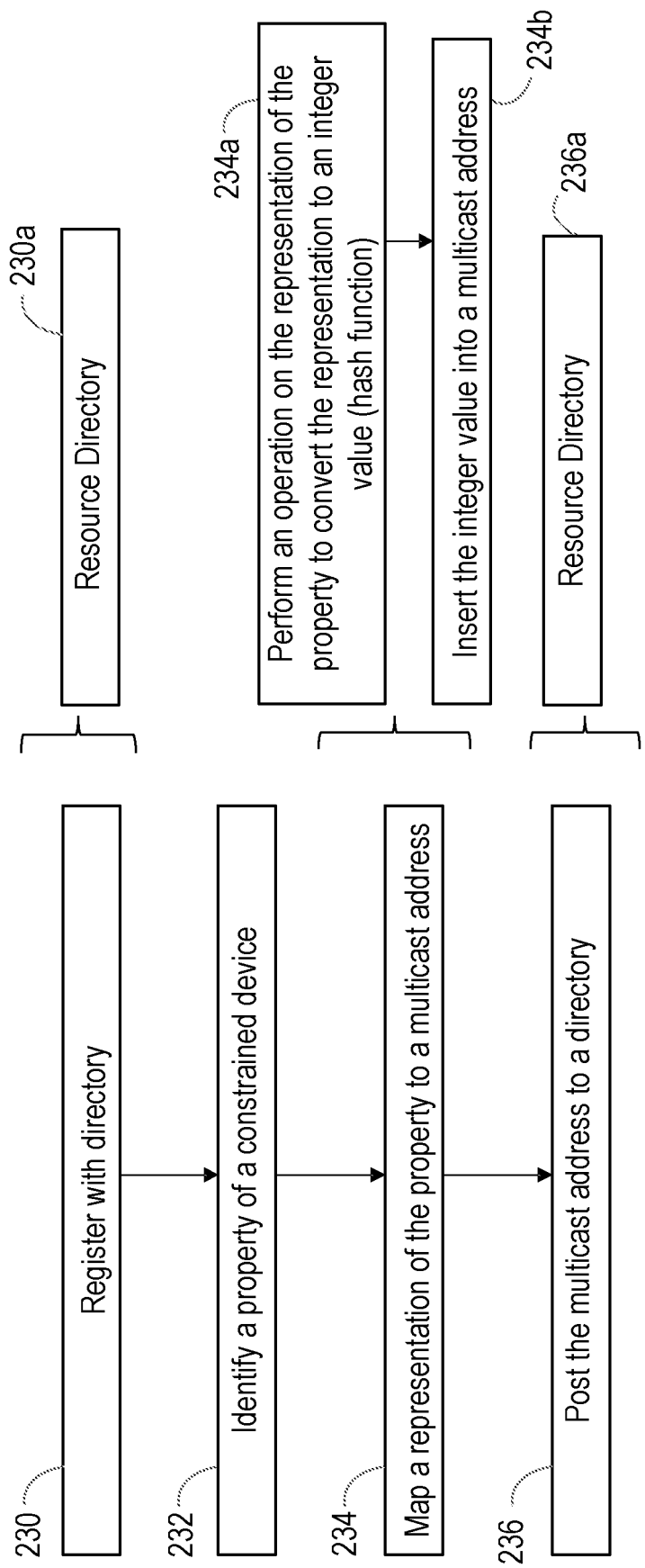

FIG. 2c illustrates further process steps that may be conducted by a constrained device as part of the method 200. The steps of FIG. 2c may be conducted after, before or may overlap in time with certain of the steps illustrated in FIGS. 2a and 2b. Referring to FIG. 2c, in step 230, the method 200 comprises the constrained device registering with a directory. As illustrated in step 230a, the directory may for example be a Resource Directory (RD) as defined in the "CoRE Resource Directory" specification: "draft-ietf-core-resource-directory-09". An example humidity sensor registration on the RD could be:

POST /rd?ep='123456789';</3304/0/5700>;rt="urn:X-ipso:hum%".

This post indicates that a sensor with the unique resource name 123456789 is to be registered on the RD. The IPSO object model data indicates that the sensor is a humidity sensor (/3304), is instance 0 of the humidity sensor (/0) and has one resource (5700) representing the humidity reading itself in percentage. The "rt" indicates that the representation used is the IPSO object model.

In step 232, the method 200 comprises identifying a property of a constrained device, which may be a property of the constrained device conducting the method 200 or may be a property of another constrained device. The property may be shared between multiple constrained devices, for example in the case of a property comprising a location, with multiple constrained devices being deployed in that location. In step 234, the constrained device maps a representation of the property to a multicast address, which may be an IPv6 multicast address. The representation of the property may for example be metadata such as text describing the property. In the case of a location property, the representation of the property may describe the location, for example "Room 7", "Building 2" etc. In the case of an owner property, the representation may be the name of the owner. In further examples, the property may combine aspects of location and constrained device type, for example "Sensors in Room 7". As illustrated in steps 234a and 234b, mapping a representation of the property to a multicast address comprises in some examples performing an operation on the representation of the property to convert the representation to an integer value, and inserting the integer value into a multicast address. The operation may for example be a hash function, and may be a commonly used hash function which is known to all constrained devices that are operating within the network. In some examples, the hash function to be used for mapping to multicast addresses may be configured into the constrained device by a device manager. Once the representation of the property has been mapped to the multicast address, notifications relating to that property may be posted to the mapped multicast address. The multicast address may also be registered as a topic for example by posting the multicast address to a directory in step 236, which directory may be a Resource Directory as discussed above and as illustrated in step 236a.

The multicast address may be posted to the RD for example by creating a new service with "rt":

POST /rd?ep='</ipv6o/xx';rt="core.ipv6o".

In this example post, "ipv6o" is the service of object publication without using a broker, and xx is the topic that constrained devices can publish and subscribe too. The topic is represented in the 64 bits of the interface ID of the IPv6 address. Thus a topic could be:

H("Room 7")=0000:0000:1 a2a:1 a2a

Once the topic has been established, future notifications about devices in Room 7 should be sent to the IPv6 FF02::1a2a:1a2a address. Similarly, devices requiring updates about that room may be configured by a device manager to accept packets on that IP address. Registering topics with the RD may ensure that such topics are available to constrained devices which may not be operating according to the method 100 or 200, and may not therefore be able to generate the appropriate multicast address. Such constrained devices may obtain the multicast address corresponding to the registered topic from the RD.

In some examples, topics relating to a constrained device property may be established by a constrained device on the fly, following an instruction from a device manager to listen to notifications concerning a particular property. This process is illustrated in FIG. 2d.

Figure 2D:
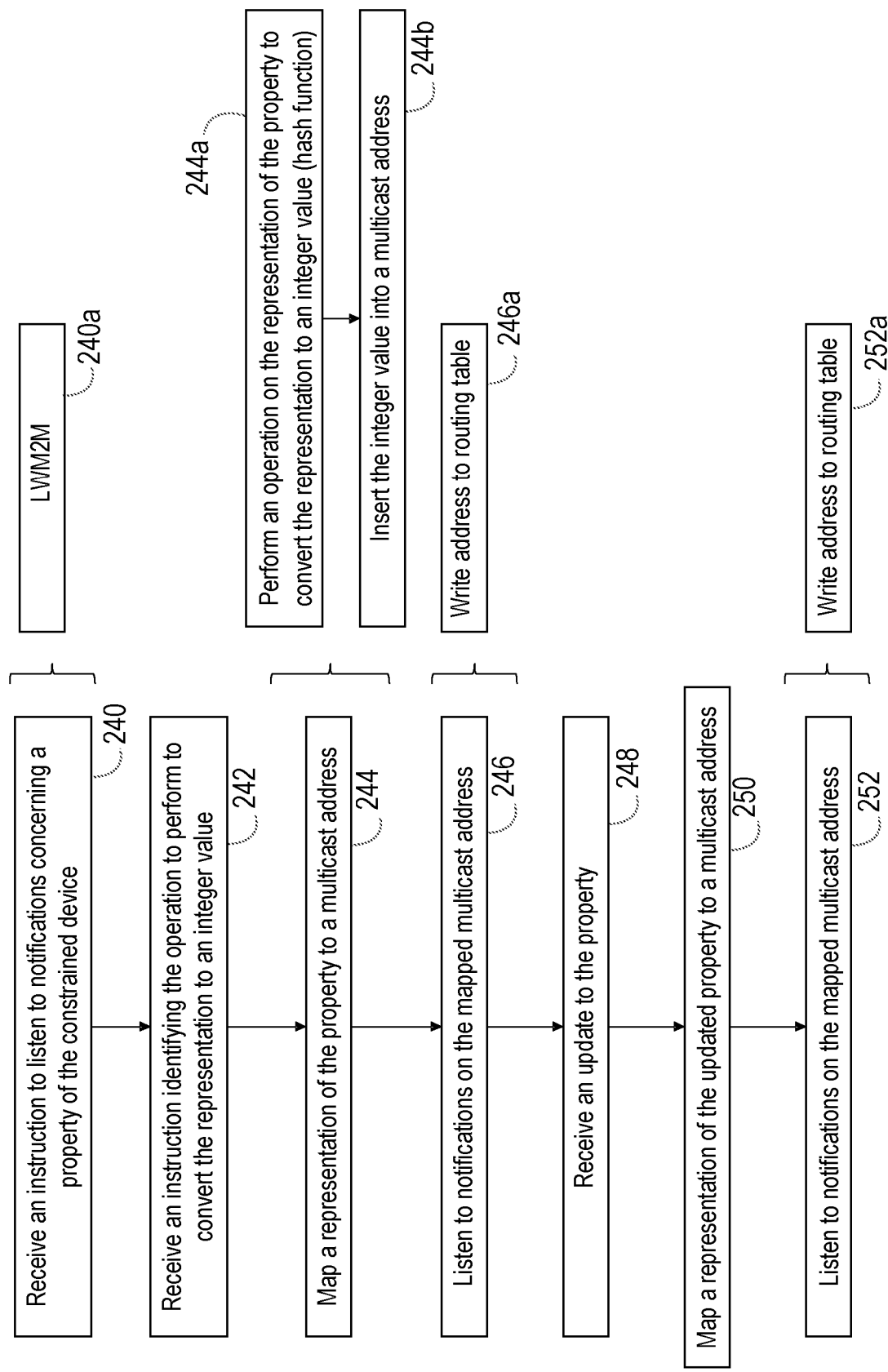

FIG. 2d illustrates further process steps that may be conducted by a constrained device as part of the method 200. The steps of FIG. 2d may be conducted after, before or may overlap in time with certain of the steps illustrated in FIGS. 2a, 2b and/or 2c.

Referring to FIG. 2d, in step 240, the constrained device receives an instruction to listen to notifications concerning a property of the constrained device. As discussed above, the property may be a location of the device, an owner of the device or any other property of the device. The instruction may be received from a device manager using the LWM2M protocol, as illustrated in step 240a. In step 242, the constrained device receives an instruction identifying an operation to perform to convert a representation of the property to an integer value. In step 244, the constrained device maps a representation of the property to a multicast address. As discussed above with reference to step 234, mapping the representation of the property to a multicast address may comprise performing an operation on the representation of the property to convert the representation to an integer value in step 244a and inserting the integer value into a multicast address in step 244b. The operation may be the operation identified in the instruction received in step 242, and may for example be a hash function. In step 246, the constrained device then listens to notifications on the mapped multicast address. In step 248, the constrained device may receive an update to the property, for example informing the constrained device that it has changed location, or has changed owner, and identifying the new location, owner or other property that has changed. The constrained device then maps a representation of the updated property to a multicast address in step 250 and listens to notifications on the mapped multicast address at step 252. The mapping step 250 may comprise the same steps of performing an operation on the representation of the property to convert the representation to an integer value and inserting the integer value into a multicast address as discussed above with reference to steps 234 and 244. The steps 246 and 252 of listening to the mapped multicast addresses may comprise writing the mapped multicast addresses into a routing table of the constrained device.

Figure 3:
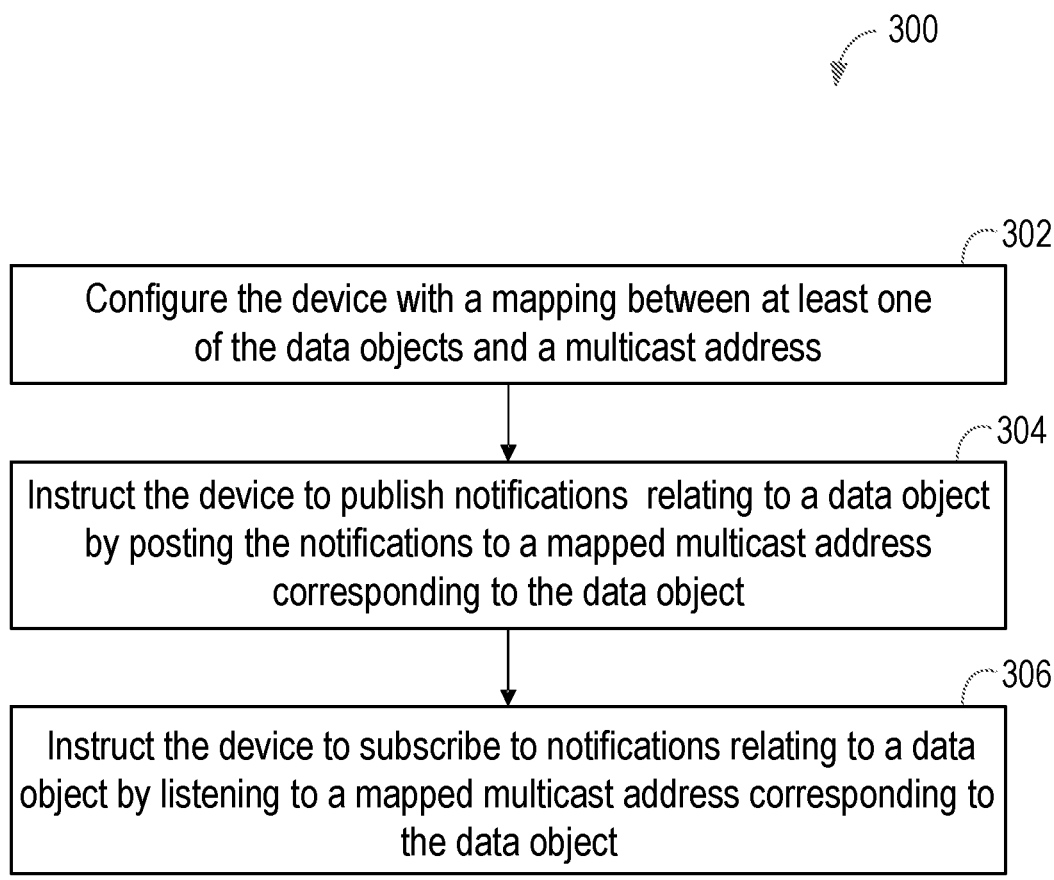
FIG. 3 is a flow chart illustrating process steps in a method for managing a constrained device within a network.

The above discussed methods for operating a constrained device make reference to a device manager, which may configure certain information in the constrained device, and may send instructions to the constrained device. FIG. 3 illustrates process steps in a method 300 which may be performed by a device manager for managing a constrained device, the constrained device being configured with a plurality of data objects. Referring to FIG. 3, the method 300 comprises, in a first step 302, configuring the device with a mapping between at least one of the data objects and a multicast address. The method then comprises, in step 304, instructing the device to publish notifications relating to a data object by posting the notifications to a mapped multicast address corresponding to the data object. In step 306, the method 300 comprises instructing the device to subscribe to notifications relating to a data object by listening to a mapped multicast address corresponding to the data object. The mapped multicast addresses may for example be IPv6 multicast addresses.

The manager conducting the method 300 may communicate with the constrained device which is being managed using the LWM2M protocol. All LWM2M clients support a well-defined set of objects [LWM2M] which objects can be added, deleted and/or modified by a LWM2M manager remotely. The configuration and instructing steps 302, 304, 306 of the method 300 may be conducted using the normal LWM2M Device Management and Service Enablement Interface to add or delete entries to or from the constrained device routing table. The manager may use the following IPSO Object model for constrained devices when triggering the updating of entries in constrained device routing tables, for example to specify which addresses a constrained device should post to when publishing a notification and should listen to when subscribing to a notification:

| Name | Object ID | Instances | Mandatory | Object URN |
|---|---|---|---|---|
| Object Publication | TBD | Multiple | Optional | TBD |

| ID | Name | Operations | Instances | Mandatory | Type | Range Or Enum | Unit | Desc. |
|---|---|---|---|---|---|---|---|---|
| 0 | Publishing Address | RW | Multiple | Optional | String | | | IPv6 addresses corresponding to the published topics |
| 1 | Subscribed Address | RW | Multiple | Optional | String | | | IPv6 addresses corresponding to the subscribed topics |

The updating of entries in the routing tables for IPv6 multicast may be handled by a router or gateway.

Figure 4A:
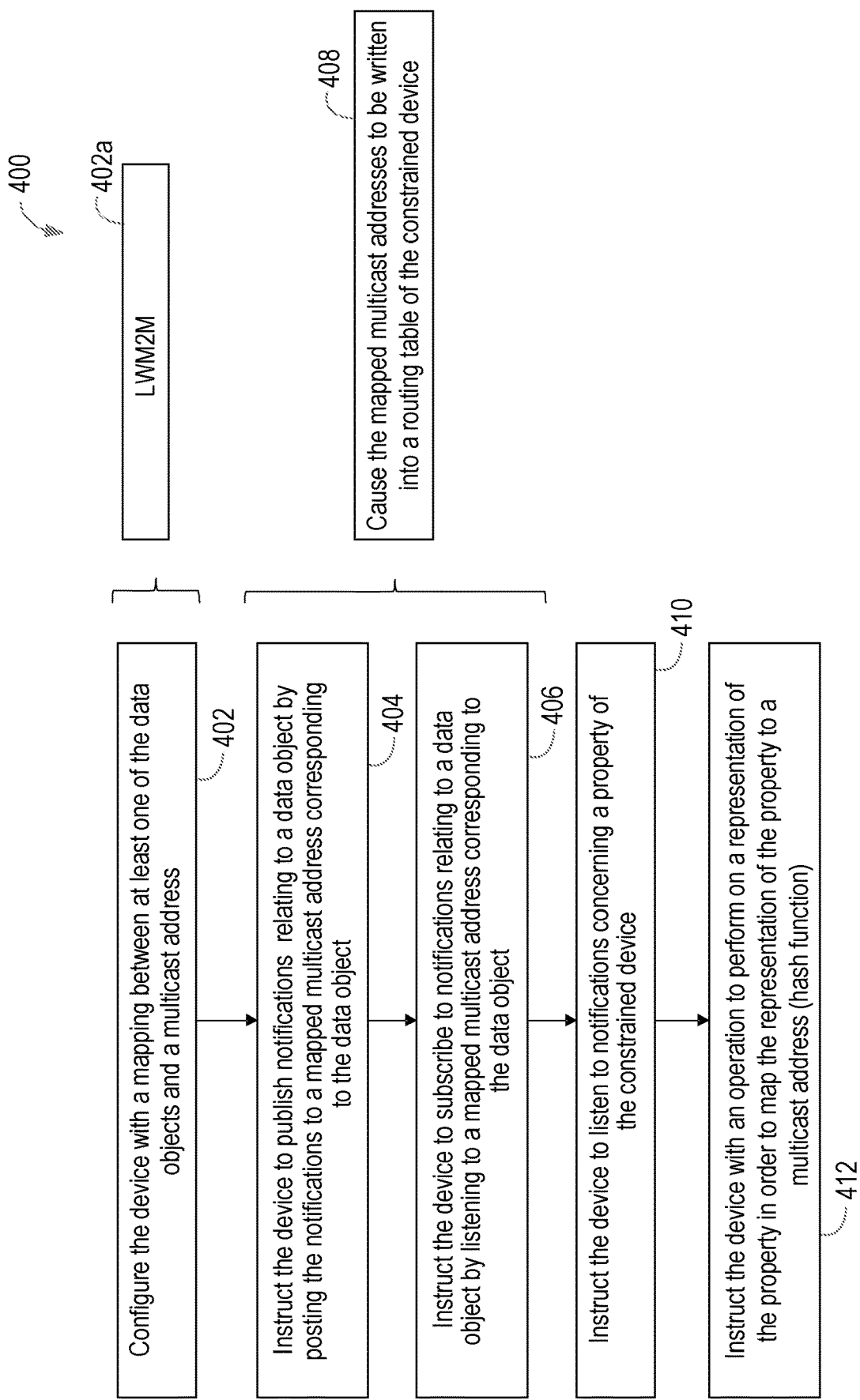
FIGS. 4a and 4b are flow charts illustrating process steps in another example of method for managing a constrained device within a network.

FIG. 4a illustrates process steps in another example of method 400 for operating a constrained device in accordance with aspects of the present disclosure. The steps of the method 400 illustrate one way in which the steps of the method 300 may be implemented and supplemented in order to achieve the above discussed and additional functionality. Referring to FIG. 4a, in a first step 402, the method 400 comprises configuring the device with a mapping between at least one of the data objects and a multicast address. This configuration may be conducted using the LWM2M protocol, as discussed above and as illustrated in step 402a. The method 400 then comprises, in step 404, instructing the device to publish notifications relating to a data object by posting the notifications to a mapped multicast address corresponding to the data object. In step 406, the method 400 comprises instructing the device to subscribe to notifications relating to a data object by listening to a mapped multicast address corresponding to the data object. The steps 404 and 406 may be conducted by causing the mapped multicast addresses to be written into a routing table of the managed constrained device, as illustrated in step 408. The actual updating of entries for the constrained device may be handled by the relevant router or gateway, as discussed above. In step 410, the method 400 comprises instructing the device to listen to notifications concerning a property of the constrained device, and in step 412 the method 400 comprises instructing the device with an operation to perform on a representation of the property in order to map the representation of the property to a multicast address. As discussed above with respect to the method 300 conducted by a constrained device, the operation may be a hash operation.

Figure 4B:
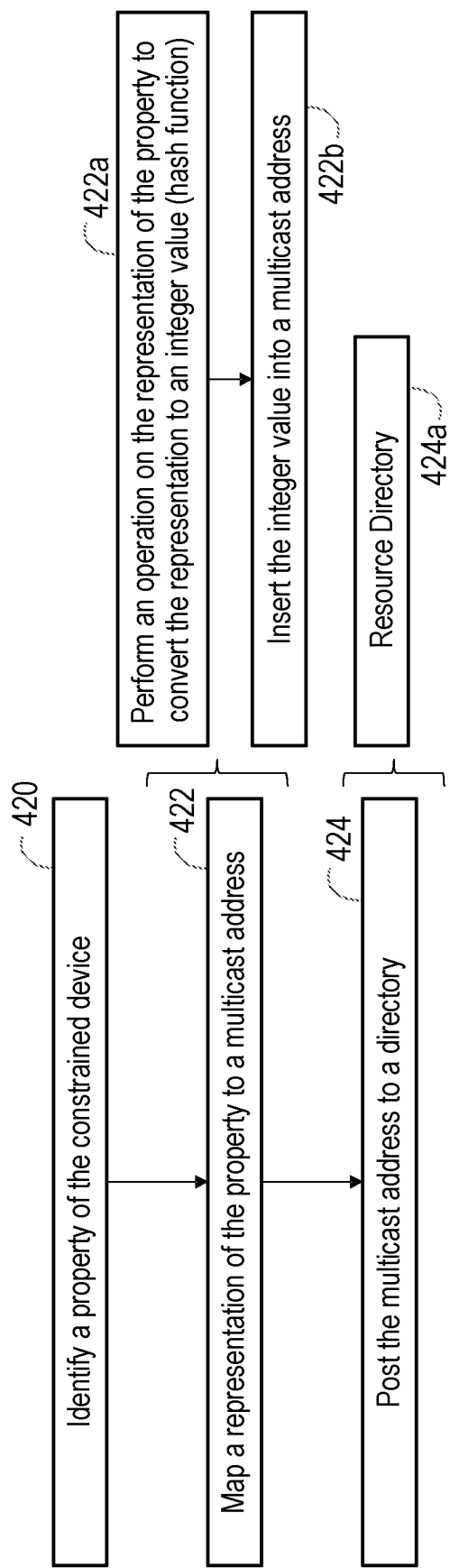

FIG. 4b illustrates further process steps that may be conducted by a constrained device manager as part of the method 400. The steps of FIG. 4b may be conducted after, before or may overlap in time with certain of the steps illustrated in FIG. 4a.

Referring to FIG. 4b, the method 400 may further comprise identifying by the constrained device manager a property of the constrained device in step 420. The method may further comprise mapping a representation of the property to a multicast address in step 422 and posting the multicast address to a directory in step 424. The directory may be a Resource Directory, as discussed above and illustrated in step 424a. The step 422 of mapping a representation of the identified property to a multicast address may comprise performing an operation on the representation of the property to convert the representation to an integer value in step 422a and inserting the integer value into a multicast address in step 422b. The operation may be the operation identified in the instruction sent to the constrained device in step 412, and may for example be a hash function. FIG. 4b thus demonstrates how a property based topic may be established by a constrained device manager and posted to a Resource Directory in substantially the same manner as discussed above with reference to these actions being performed by a constrained device.

Figure 5:
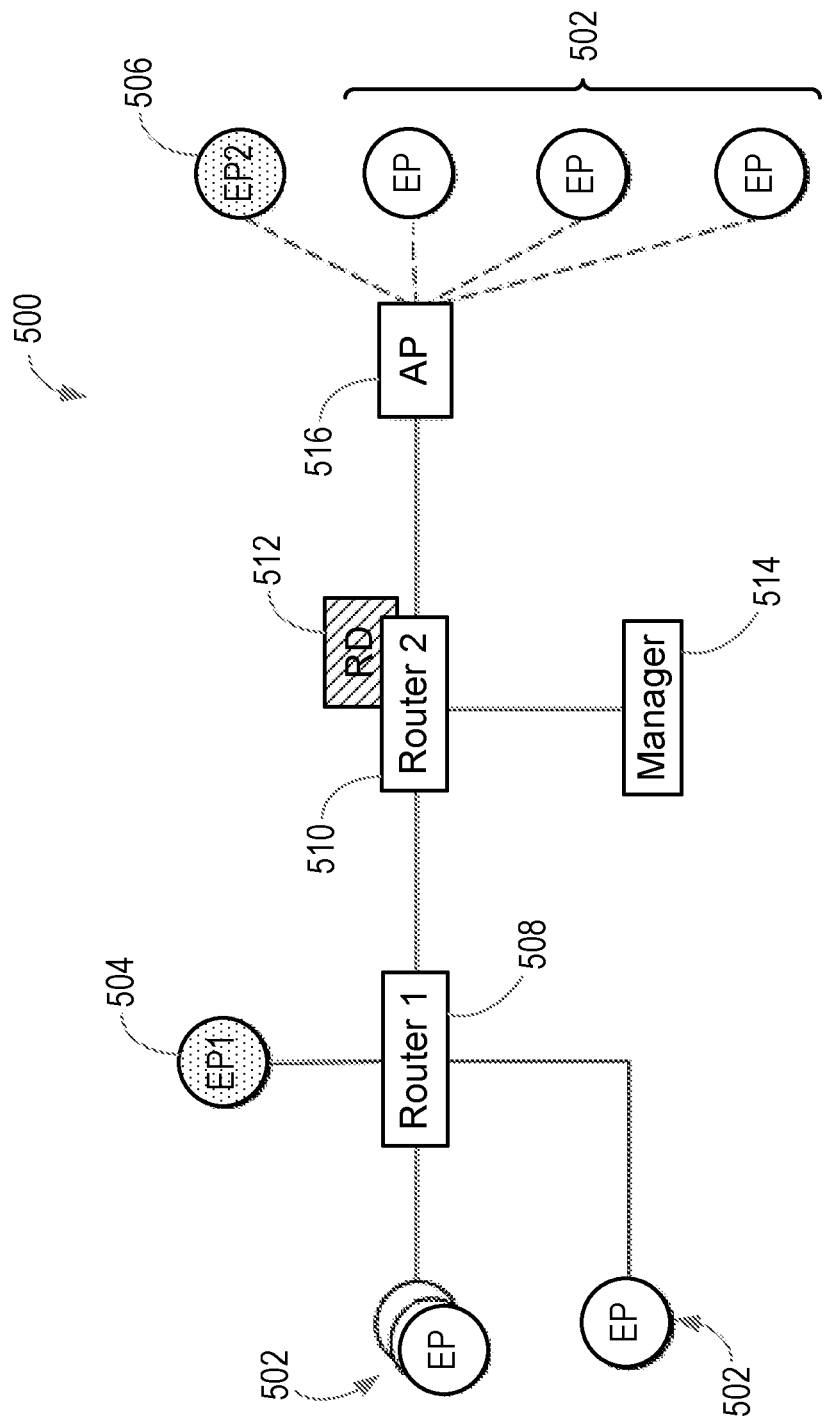
FIG. 5 is a schematic representation of an example IPv6 network.

FIG. 5 illustrates an example network 500 within which constrained devices and a constrained device manager may operate according to the methods 100, 200, 300, 400 described above. Referring to FIG. 5, the network 500 is an IPv6 network comprising an Access Point 516 and first and second routers 508, 510. The network further comprises a manager 514, a Resource Directory 512 and a plurality of constrained devices 502. The constrained devices are illustrated as CoAP End Points (EPs). Among the plurality of EPs 502 are EP1 504 and EP2 506.

Figure 6:
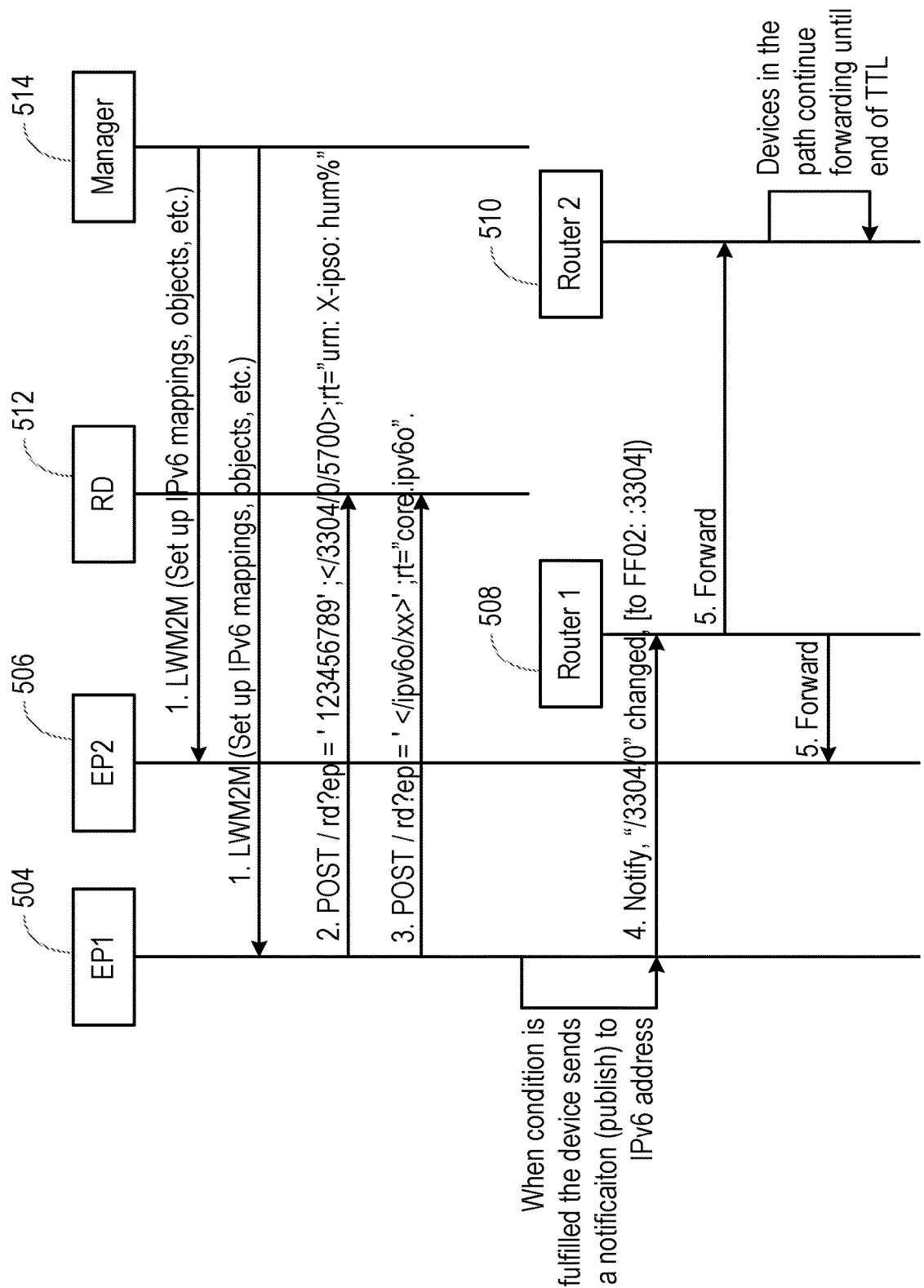
FIG. 6 is a signalling diagram illustrating signalling in the network of FIG. 5 according to example methods for operating and managing a constrained device within a network.

FIG. 6 is a signalling diagram illustrating signalling between elements of the network 500 according to examples of the methods discussed above. The signalling illustrates initial configuration of EP1 and EP2 by the manager 514, registration of EP1 with the Resource Directory 512, creation and registration of a topic by EP1 and publication by EP1 of a notification. Referring to FIG. 6, in step 1, a set of IPSO objects and their mappings to IPv6 addresses are configured on constrained devices EP1 and EP2 by the manager 514 using the LWM2M protocol. The manager also establishes observations or subscriptions between EPs and towards the manager, as well as handling any errors that may occur during normal functioning of the network. As discussed above, subscriptions may be established between EPs by causing the appropriate IPv6 multicast entries to be added to the routing tables of the EPs. Thus in an example scenario, a subscription to notifications for all of the lights that are on may be established by simply adding FF02::1:3306 to the table of the subscriber device.

In step 2, EP1 registers its resources in the RD with pointers following the IPSO Object model as discussed above. In step 3, EP1 registers a new topic by using: POST /rd?ep='</ipv6o/xx>';rt="core.ipv6o", also as discussed in further detail above.

In step 4, when an appropriate condition is fulfilled to trigger the publication of a notification, EP1 publishes a notification by posting the notification to the appropriate mapped IPv6 multicast address. Thus for the example of a humidity sensor, the sensor EP1 may send a notification to FF02::3304 whenever its humidity reading changes, or according to a predetermined schedule or setting established by the manager 514.

The notification is received at router 1 and is routed through the local network at step 5. Receiving nodes will drop the notification if the address originator is unknown, if they do not have forwarding capability, for example in the case of constrained single-hop sensor networks, or if the notification exceeds its TTL.

Figure 7:
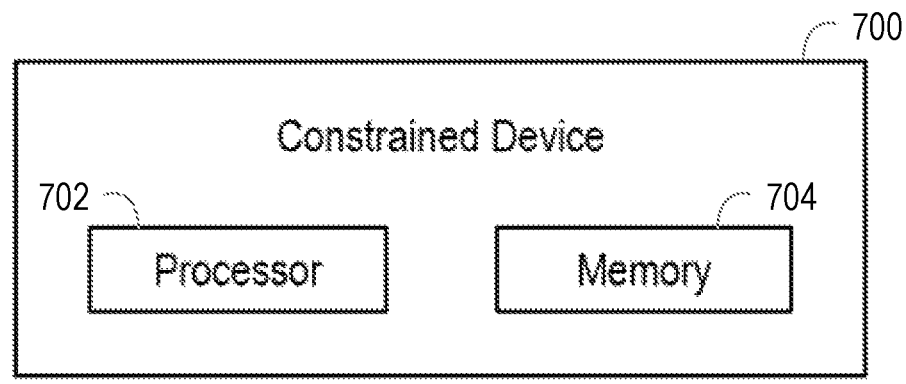
FIG. 7 is a block diagram illustrating functional elements in a constrained device.

As discussed above, the methods 100, 200 may be performed by a constrained device. FIG. 7 is a block diagram illustrating an example constrained device 700 which may implement the methods 100, 200 according to examples of the present disclosure, for example on receipt of suitable instructions from a computer program. Referring to FIG. 7, the constrained device 700 comprises a processor 702 and a memory 704. The memory 704 contains instructions executable by the processor 702 such that the constrained device 700 is operative to conduct the steps of the method 100 and/or 200.

Figure 8:
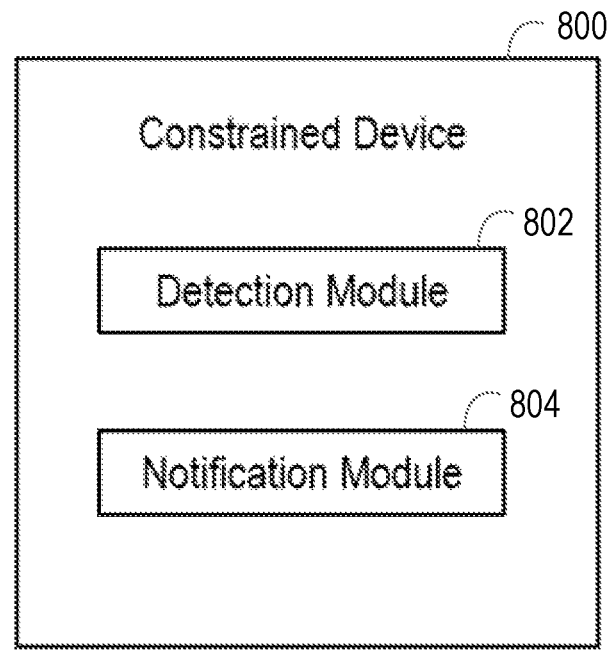
FIG. 8 is a block diagram illustrating functional elements in another example of constrained device.

FIG. 8 illustrates functional units in another example of constrained device 800 which may execute examples of the methods 100, 200 of the present disclosure, for example according to computer readable instructions received from a computer program. It will be understood that the units illustrated in FIG. 8 are functional units, and may be realised in any appropriate combination of hardware and/or software. The units may comprise one or more processors and may be integrated to any degree.

Referring to FIG. 8, the constrained device 800 comprises a detection module 802 for detecting that the constrained device should send a notification. The constrained device 800 also comprises a notification module 804 for determining a topic to which the notification relates and, if the topic corresponds to a data object, for retrieving the data object to which the topic corresponds, retrieving a mapped multicast address corresponding to the data object, and posting the notification to the retrieved multicast address.

Also as discussed above, the methods 300, 400 may be performed by a constrained device manager. The manager may be a single element or may be part of a distributed management function, which may for example be a Virtualized Network Function.

Figure 9:
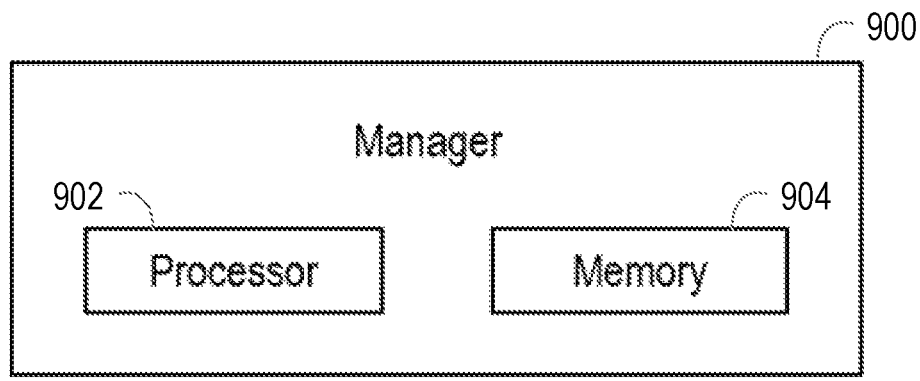
FIG. 9 is a block diagram illustrating functional elements in a manager.

FIG. 9 is a block diagram illustrating an example manager 900 which may implement the methods 300, 400 according to examples of the present disclosure, for example on receipt of suitable instructions from a computer program. Referring to FIG. 9, the manager 900 comprises a processor 902 and a memory 904. The memory 904 contains instructions executable by the processor 902 such that the manager 900 is operative to conduct the steps of the method 300 and/or 400.

Figure 10:
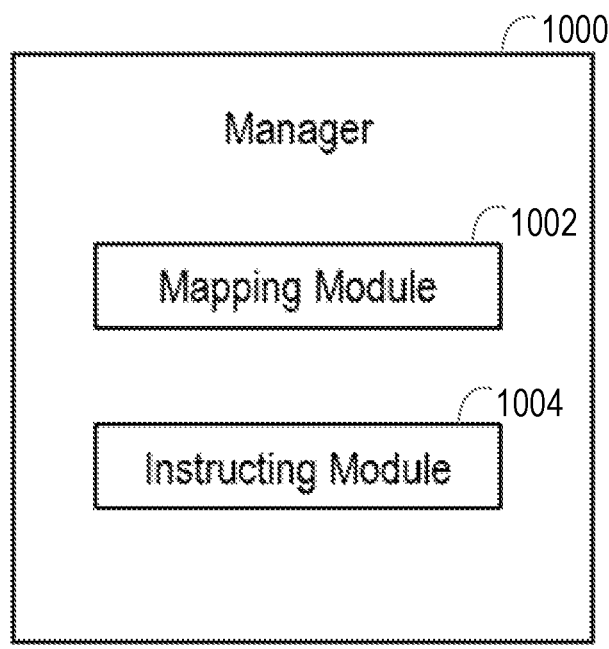
FIG. 10 is a block diagram illustrating functional elements in another example of manager.

FIG. 10 illustrates functional units in another example of manager 1000 which may execute examples of the methods 300, 400 of the present disclosure, for example according to computer readable instructions received from a computer program. It will be understood that the units illustrated in FIG. 10 are functional units, and may be realised in any appropriate combination of hardware and/or software. The units may comprise one or more processors and may be integrated to any degree.

Referring to FIG. 10, the manager 1000 comprises a mapping module 1002 for configuring a managed constrained device with a mapping between at least one data object and a multicast address. The manager 1000 also comprises an instructing module 1004 for instructing the device to publish notifications relating to a data object by posting the notifications to a mapped multicast address corresponding to the data object. The notification module 1004 is also for instructing the device to subscribe to notifications relating to a data object by listening to a mapped multicast address corresponding to the data object.

Aspects of the present disclosure thus provide methods implementing a brokerless publication scheme in IoT networks. The scheme may in some deployments use the CoAP and LWM2M protocols. Example methods of the present disclosure enable a publish/subscription broker in IoT networks to be dispensed with; mapping objects and/or topics to multicast addresses, which may be IPv6 addresses, and using these addresses to both publish and subscribe to notifications without the need for a broker. Example methods of the present disclosure simplify the distribution of IoT data in networks. For networks supporting IPv6 multicast, the methods may use the existing IPv6 infrastructure with minimal changes, making the methods easy to adopt in such networks. In addition, the distributed nature of the scheme implemented by the methods and the removal of a broker node simplify deployment and increase the resilience of data distribution to external attacks. In a standard deployment, the broker represents a single point of failure which can affect an entire network. Without the broker, the system is not only more resistant to external attacks but also to failure in one or more of the network elements. Example methods of the present disclosure also offer the advantage of being relatively self managing after initial set up. For example, having been configured with what properties it should listen to notifications about, and what operation to use to generate multicast addresses, a constrained device can adapt to changes in properties without further intervention by a manager, generating the correct multicast address and listening to notifications on that address. Example methods according to the present disclosure may be particularly suited to deployment in small to medium sized enterprise networks and in home networks.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for operating a constrained device within a network, the constrained device being configured with a plurality of data objects and a mapping between at least one of the data objects and a multicast address, the method comprising:
   detecting that the constrained device should send a notification;
   determining a topic to which the notification relates;
   responsive to the topic corresponding to a data object, retrieving the data object to which the topic corresponds;
   responsive to the topic corresponding to a data object, retrieving a mapped multicast address corresponding to the data object; and
   responsive to the topic corresponding to a data object, posting the notification to the retrieved multicast address.

2. A method as claimed in claim 1, further comprising:
   responsive to the topic corresponding to a property of a controlled device, retrieving a mapped multicast address corresponding to the property; and
   responsive to the topic corresponding to a property of a controlled device, posting the notification to the retrieved multicast address.

3. A method as claimed in claim 1, further comprising:
   associating a Time To Listen, TTL, with the notification when posting the notification.

4. A method as claimed in claim 1, further comprising:
   receiving a notification on a multicast address to which the constrained device is listening; and
   forwarding the notification on the multicast address.

5. A method as claimed in claim 4, further comprising:
   checking for a TTL associated with the notification; and
   only forwarding the notification if the TTL has not been reached.

6. A method as claimed in claim 1, further comprising:
   identifying a property of a constrained device;
   mapping a representation of the property to a multicast address; and
   posting the multicast address to a directory.

7. A method as claimed in claim 6, wherein mapping a representation of the property to a multicast address comprises:

performing an operation on the representation of the property to convert the representation to an integer value; and inserting the integer value into a multicast address.

8. A method as claimed in claim 7, wherein the operation comprises a hash function.

9. A method as claimed in claim 1, further comprising:
receiving an instruction to listen to notifications concerning a property of the constrained device;
mapping a representation of the property to a multicast address; and
listening to notifications on the mapped multicast address.

10. A method for managing a constrained device within a network, the constrained device being configured with a plurality of data objects, the method comprising:
configuring the device with a mapping between at least one of the data objects and a multicast address;
instructing the device to publish notifications relating to a data object by posting the notifications to a mapped multicast address corresponding to the data object; and
instructing the device to subscribe to notifications relating to a data object by listening to a mapped multicast address corresponding to the data object.

11. A method as claimed in claim 10, further comprising:
instructing the device to listen to notifications concerning a property of the constrained device.

12. A method as claimed in claim 11, further comprising:
instructing the device with an operation to perform on a representation of the property in order to map the representation of the property to a multicast address.

13. A method as claimed in claim 10, further comprising:
identifying a property of the constrained device;
mapping a representation of the property to a multicast address; and
posting the multicast address to a directory.

14. A method as claimed in claim 13, wherein mapping a representation of the property to a multicast address comprises:
performing an operation on the representation of the property to convert the representation to an integer value; and
inserting the integer value into a multicast address.

15. A method as claimed in claim 14, wherein the operation comprises a hash function.

16. A method as claimed in claim 10, wherein the configuring the device comprises communicating over the Lightweight Machine to Machine, LWM2M specification.

17. A method as claimed in claim 10, wherein the multicast address comprises an IPv6 multicast address.

18. A method as claimed in claim 10, wherein the device is configured to communicate using a RESTful protocol.

19. A constrained device, the constrained device being configured with a plurality of data objects and a mapping between at least one of the data objects and a multicast address, the constrained device comprising:
a processor; and
a memory, the memory containing instructions executable by the processor that, when executed by the processor, cause the constrained device to,
detect that the constrained device should send a notification,
determine a topic to which the notification relates,
responsive to the topic corresponding to a data object retrieve the data object to which the topic corresponds,
responsive to the topic corresponding to a data object, retrieve a mapped multicast address corresponding to the data object, and
responsive to the topic corresponding to a data object, post the notification to the retrieved multicast address.

20. A manager for managing a constrained device, the constrained device being configured with a plurality of data objects, the manager comprising:
a processor; and
a memory, the memory containing instructions executable by the processor that, when executed by the processor, cause the manager to,
configure the device with a mapping between at least one of the data objects and a multicast address,
instruct the device to publish notifications relating to a data object by posting the notifications to a mapped multicast address corresponding to the data object, and
instruct the device to subscribe to notifications relating to a data object by listening to a mapped multicast address corresponding to the data object.

* * * * *